United States Patent Office

3,846,170
Patented Nov. 5, 1974

3,846,170
METHOD OF FORMING ELECTRICALLY INSULATING CHEMICAL CONVERSION COATING ON ALUMINUM WIRES
Kazuo Isawa, Masatsugu Maejima, Kuninosuke Kiuchi, Ken Yokota, and Masaru Ogawa, Tokyo, Japan, assignors to The Fujikura Cable Works, Ltd., Tokyo, Japan
No Drawing. Filed Sept. 11 1972, Ser. No. 288,173
Claims priority, application Japan, July 7, 1972, 47/68,065
Int. Cl. B44d 1/18; C23f 7/26
U.S. Cl. 117—218                          7 Claims

ABSTRACT OF THE DISCLOSURE

A method of forming an electrically insulating coating composed of alumina and chromium oxide on the surfaces of aluminum or aluminum alloy wires by passing the wires through a treating solution held at 80 to 110° C. of sodium carbonate and sodium chromate in a concentration of 20 to 200 grams per liter of water and in which the weight ratio of sodium carbonate to sodium chromate ranges from 10:5 to 10:10. The method also comprises applying a layer of a synthetic resin and a layer of paraffin successively onto the chemical conversion coating to provide insulating aluminum wires having especially good thermal stability and abrasion resistance and therefore having utility as magnet wires.

BACKGROUND OF THE INVENTION

1. Field of the Invention

This invention relates to a method of forming an electrically insulating chemical conversion coating on the surfaces of aluminum wires, and especially to a method of producing aluminum wires having an electrically insulating chemical conversion coating which are superior in thermal stability and abrasion resistance and have utility as magnet wires.

2. Description of the Prior Art

"Alumite" wires obtained by forming a layer of alumina on the surfaces of aluminum wires, for example, by anodic oxidation have previously found wide applications in electric machinery which is desired to be light in weight, such as a lifting machine, e.g., a lifting magnet. However, the alumina coating of these wires has high hardness and low bending properties. Therefore, when Alumite wires of small diameters are bent with a small bending degree, there is the defect that fine cracks are formed in an alumina layer. Furthermore, the cost per unit area incurred in forming an insulating coating is high in comparison with the other insulating methods.

It was therefore proposed to form a coating of a mixture of chromium oxide and alumina on the surfaces of aluminum wires by utilizing such a method as the MBV method, the Alrok method or the Pylumin method, all of which are known as chemical conversion treatments of aluminum. According to these methods, aluminum wires are immersed in a chemical conversion solution consisting mainly of a mixture of sodium carbonate and sodium chromate in a weight ratio of not more than 10:3. By this procedure, a coating can be formed easily, but the thickness of the coating is small and it has low insulation breakdown voltage. In addition, the adhesion of the coating to the aluminum is poor. All these defects make these wires useless as insulating wires.

The present invention provides a remedy to the above-described defects.

An object of this invention is to provide a low-cost method for easily producing aluminum wires having an electrically insulating coating, which has superior adhesion to an aluminum conductor and a practical thickness and an insulation breakdown voltage, while making the most of the properties of an inorganic insulation, such as thermal resistance or resistance to corona discharge.

SUMMARY OF THE INVENTION

After having made various studies on these defects, it was found that since the concentration of sodium carbonate is too high in the conventional methods as compared with the concentration of sodium chromate, a coating formed by sodium chromate is destroyed by the sodium carbonate, and that because the particles forming the coating become too fine, the metal surface is prevented from contacting the treating solution to inhibit the growth of the coating. Based on these results, it was found that if the concentration of the sodium carbonate is rendered low in comparison with that of sodium chromate, an insulating coating that can be used for electrically insulating wires could be obtained.

The above-described objects are achieved by the method of this invention for forming a coating composed of a mixture of alumina and chromium oxide on the surfaces of aluminum wires which comprises immersing the aluminum wires in a chemical conversion treating solution consisting essentially of a mixture of sodium carbonate ($Na_2CO_3$) and sodium chromate ($Na_2CrO_4$) in a weight ratio of from 10:5 to 10:10, preferably 10:6 to 10:7. According to this method, the coating formed grows without inhibition to form a firmly adherent coating. A suitable concentration of the mixture of the sodium carbonate and sodium chromate in the above ratio in the chemical conversion solution is from 20 to 200 g., preferably 120 to 150 g. per liter of water. If the chemical conversion treatment is carried out at a temperature of 80° to 110° C., preferably 90 to 100° C., a coating having an insulation breakdown voltage value of at least 50 v., which is the minimum value required, can be obtained within several minutes.

Where the coated aluminum wires are to be used as magnet wires which require high degrees of thermal stability and abrasion resistance, a synthetic resin varnish such as an acrylic resin, epoxy resin or silicone resin varnish is impregnated into the alumina-chromium oxide coating and dried, and paraffin is coated on the synthetic resin coating.

DETAILED DESCRIPTION OF THE INVENTION

The chemical conversion treating solution for forming an electrically insulating coating consisting of a mixture of alumina and chromium oxide on the surfaces of aluminum wires should basically be an aqueous solution containing sodium carbonate and sodium chromate in a weight ratio of from 10:5 to 10:10. Desirably, the concentration of the mixture in the aqueous solution ranges from 20 to 200 g. per liter of water.

If the weight ratio of sodium chromate is less than 5 for each 10 parts of sodium carbonate, the growth of the coating is slow, and in spite of the fact that the resulting coating is thinner than expected, it is hard and brittle to an impractical degree. If, on the other hand, the ratio of sodium chromate is above 10 for each 10 parts of sodium carbonate, the rate of growth of the coating is rapid, but the resulting coating is undesirable because of its poor resistance to bending and low value to corona starting voltage.

When the concentration of the mixture of sodium carbonate and sodium chromate is less than 20 g./liter, the solution is too dilute, and the reaction is slow. Furthermore, the coating obtained is too hard. If the concentration exceeds 200 g./liter, the coating obtained is a thick layer having a high bulk density, but its adhesion to the aluminum wires is low and this is undesirable for practical purposes.

The chemical conversion treating solution may also contain basic chromium carbonate, basic sodium carbonate, sodium hydroxide or a surface active agent, for example, amphoteric surface active agents such as an alkyl amino sodium propionate as an amino acid type surface active agent or an alkyl dimethyl betaine as a betaine type of surface active agent, in order to stabilize the properties of the solution, or a pigment or dye in order to color the coating formed. Especially, the addition of sodium hydroxide in an amount of from 2 to 10 g., preferably 4 to 8 g. per liter of the solution contributes to an increased rate of formation of the coating.

The chemical conversion treatment is preferably carried out at a temperature not higher than the boiling point of the treating solution but not lower than 80° C. Treatment at below 80° C. results in slow rates of reaction and in a coating of the fine particles of alumina and chromium oxide, in which case the resulting coating becomes too high and the desired thickness of the coating is difficult to obtain. If the temperature exceeds the boiling point of the solution, pores are formed in the resulting coating due to the bubbles occurring from the surfaces of the wires. Where the chemical conversion treatment is carried out at 80 to 110° C., a coating having an insulation breakdown voltage value of at least 50 v. which is the minimum value required for an electrically insulated wire of this kind can be produced within three minutes.

X-ray diffraction analysis of the resulting coating shows that the coating obtained by this method comprises a mixture of alumina and chromium oxide in a ratio of about 3:1.

An aluminum plate having a thickness of 1.0 mm. and a width of 30 mm. was treated with the chemical conversion solution in accordance with the method of this invention, and the properties of the coated plate were measured. A coated layer was formed on the same aluminum plate by the conventional chemical conversion treatment and the anodic oxidation method, respectively, and the properties of the coated plate were determined. The results obtained are shown in Table 1.

Al or an Al alloy. The standard solution components and conditions are as follows:

(1) Solution component

| | G/lit. |
|---|---|
| Potassium dichromate | 10 |
| Sodium carbonate | 25 |
| Potassium aluminum sulfate | 1.0 |

(2) Treating condition

Same as in a MBV method.

It can be seen from the results shown in Table 1 that since the method of this invention brings about a higher rate of coat formation where the treating time is fixed, the resulting coating has a large thickness and a high resistance to voltage per unit thickness of the coating, which insulation breakdown voltage value is feasible as a coating of an insulated wire.

The hardness of the coating obtained by the method of this invention is somewhat higher than that obtained with the conventional chemical conversion method. When the coated aluminum plate was bent, the coating obtained by the conventional method broke finely and generated fine powders, whereas no change was observed in the coating obtained by the method of this invention, which demonstrates that the adhesion of the coating is very superior.

Since the insulated wires obtained by the method of this invention contain an insulating coating composed of an inorganic material, they have high rigidity and their mechanical properties have still something to be desired. With a view to making up for this insufficiency, a coating of a resin may be provided on top of the chemical conversion coating obtained by the method described above. The provision of this resin coating is effected, for example, by immersing the chemically treated aluminum wires in a solution of polyvinyl alcohol in a concentration of from 50 to 100 g./liter. The degree of saponification and the molecular weight of the polyvinyl alcohol are not limited in particular. A suitable molecular weight ranges from about 1,000 to 2,500 with a degree of saponification of more than 85%.

The desired effects cannot be obtained if the concentration is below 50 g./liter, and concentrations of above 100 g./liter do not produce the increased effects and are

TABLE 1

| | Method of this invention | Conventional chemical conversion method | | | | Anodic oxidation method |
|---|---|---|---|---|---|---|
| | | MBV method | | BV method | | |
| Treatment time (min.) | 3 | 5 | 3 | 5 | 3 | 5 | 5 |
| Thickness of coating (μ) | 3 | 5 | 1.3 | 2.0 | 1.2 | 1.8 | 8 |
| Insulation breakdown, voltage value (v.) (superposed) | 60 | 100 | 4 | 1.0 | 3 | 8 | 200 |
| Pencil hardness (H) | 4 | 5 | 3 | 4 | 3 | 4 | 8 |
| Resistance to bending (self diameter bending) | Fine powders did not occur, and also cracks did not form | | Fine powders occurred | | | | (¹) |

¹ Fine powders occurred, and also cracks formed.

In the above Table 1, MBV is an abbreviation for "modifizierte Bauer-Vogel process" and is a surface treating method for imparting an anti-corrision resistance to the surface of Al or an Al alloy. The standard treating solution components and treating conditions used in the MBV method are as follows:

(1) Solution component

| | G./lit. |
|---|---|
| Sodium chromate (Na₂CrO₄) | 15 |
| Sodium carbonate (Na₂CO₃) | 30 |

(2) Treating condition

| Temperature | ° C. | 90–100 |
|---|---|---|
| Period | min. | 2–5 |

BV method is an abbreviation for "Bauer-Vogel process" and as the MBV method, is a surface treatment for imparting an anti-corrosion resistance to the surface of uneconomical. By immersing the aluminum wires in this polyvinyl alcohol solution held at 70 to 90° C. for 1 to 5 minutes, the physical properties of the chemical conversion coating are remarkably improved, and especially, its insulation breakdown voltage and hardness are increased markedly. Therefore, the aluminum wires so obtained can be used satisfactorily in applications that require a high level of these characteristics, such as for magnet wires.

Acrylates and silicone resins can also be used as resins in this invention. Suitable acrylates which can be employed are those having a viscosity of from 2 to 5 cps. and a non-volatile content of from 35 to 45% by weight. Suitable silicones are those having a specific gravity of from 1.0 to 1.1, and a viscosity of from 0.7 to 1.5 cps. Where acrylates are employed, a suitable treatment temperature is about 80 to 120° C. for about 1 to 5 minutes and where silicones are employed, a suitable treatment temperature is from about 120 to 150° C. for about 1 to 5 minutes.

Basically, this invention provides a method of forming a coating of alumina and chromium oxide on the surfaces of aluminum wires by passing the wires through a chemical conversion treating solution consisting essentially of a mixture of sodium carbonate and sodium chromate in a weight ratio of from 10:5 to 10:10 in a concentration of 20 to 200 g./liter of water. Where it is desired to impart a higher level of thermal stability and resistance to abrasion, the aluminum wires having the chemical conversion coating are immersed in a synthetic resin varnish such as an acrylic resin varnish, and an excess of the varnish is squeezed by felt, followed by drying with hot air to remove the solvent in the varnish. Then, the treated aluminum wires are immersed in a liquid obtained by heat-melting solid paraffin, followed by drying. Such a post-treatment results in a coating having improved mechanical and electrical properties, especially bending properties and abrasion resistance, which are ascribable to the coated resin, and also, the resin layer adheres firmly to the alumina-chromium oxide coating. The paraffin layer coated on top of it contributes to an improvement in abrasion resistance, and because of its adherence prevents the deterioration of the coating caused by the decomposition, evaporation, etc. of the plasticizer or stabilizer contained in the resin varnish. These advantages make it possible to use and store the aluminum wires having a chemical conversion coating for long periods of time.

Accordingly, the present invention makes it possible to obtain aluminum wires having a chemical conversion coating which have satisfactory properties as magnet wires in regard to electric insulation and thermal stability as well as bending properties and adhesion. In addition, the equipment required to carry out the method of this invention is simpler than that for the conventional anodic oxidation, and the formation of the coating requires little control and is easy and safe. Also, the quantities of electric power and other utilities are small. Therefore, the cost of production of the wires can be made extremely low. The method of this invention is especially beneficial for producing aluminum wires having an insulating chemical conversion coating which have relatively small conductor diameters.

By the term "aluminum," as used in the present specification and claims, is meant not only aluminum itself but also an aluminum alloy having a major proportion of aluminum. Suitable elements which can be present in the aluminum alloy predominantly of aluminum are silicon, iron, copper, manganese, magnesium, chromium, nickel, zinc, titanium, etc., for example aluminum alloys 2017, 2024, 5052, 6061 and 6063 (U.S.A. Aluminum Association Code) are suitable. The term "aluminum wires" is meant to include not only those having a circular section, but also those having a rectangular sectional shape and those in the belt form, which are made of aluminum or an aluminum alloy.

The synthetic resin varnish described above contains synthetic resin having a network structure, and is a solution of the resin in a solvent together with other additives. Examples of the resin are:

"Methalack M"
  trademark for an acrylic resin predominantly comprising methyl methacrylate, Fujikura Kasei Co., Ltd.
"Epikote OL"
  trademark for an epoxy resin, having a molecular weight of about 200,000, an intrinsic viscosity in dimethoxy-ethane of 0.39 (di/g.), and a hydroxyl group content of 0.35 (equiv./100 g.), Shell Oil Company; and
"TSR 144"
  trademark for a silicone resin,
  Color: slightly yellowish and transparent
  Specific gravity (25° C.): 1.01±0.02
  Viscosity (25° C.) (poise): 0.5–1.5
  Non-volatile content (percent): 50±2
  Film applying thickness (mm.): more than 0.03
  Drying time (100° C.) (hr.): within 1
  Volume resistivity ($\Omega$cm.): more than $10^{15}$
  Insulating breakdown strength (kv./0.1 mm.): more than 7.0,
  Tokyo Shibaura Electric Co., Ltd.

As the paraffin, solid paraffin 130–145 specified in JIS (Japan Industrial Standard) is preferred.

The invention will be described in greater detail by the following examples. In the examples to follow, the following testing methods were used to determine the characteristics of the wires.

(a) Film Thickness: Testing method for enameled copper wire (JIS C 3003)
(b) Voltage Resistance:
  (i) Voltage resistance of two twisted wires (JIS C 3003)
  (ii) Voltage resistance (superposed).

The voltage resistance was measured by superposing two materials, each of which was electrically connected to a volt meter. A load of 1 kg./cm.$^2$ was placed on the two superposed materials and the voltage resistance was measured.

(c) Pencil hardness (JIS C 3003)
(d) Reciprocal abrasion (JIS C 3003)
(e) Self diameter winding (JIS C 3003).

EXAMPLE 1

An annealed aluminum conductor (more than 99.7% purity) with a diameter of 0.9 mm. was continuously passed through a chemical conversion treating bath containing a chemical conversion treating solution of the following composition held at 90° C. at a speed such that it was immersed in the solution for 5 minutes. Then, the aluminum conductor was passed through a wash bath filled with warm water at 80° C. to form an insulating wire having a coating of a mixture of alumina and chromium oxide.

Composition of the Chemical Conversion Treating Solution

|  | G./liter |
| --- | --- |
| $Na_2CO_3$ | 70 |
| $Na_2CrO_4$ | 35 |
| NaOH | 4 |

TABLE 2

| Material | Coating thickness ($\mu$) | Insulation breakdown, voltage of two twisted wires (v.) | Pencil Hardness (H) | Adhesion (self-diameter winding) [1] |
| --- | --- | --- | --- | --- |
| 0.9$\Phi$ A-Al [2] | 5 | [3] 90 | 5 | Fine powders did not occur, and also cracks did not form. |
|  |  | [4] 70 | 5 | Do. |

[1] The test of adhesion using self-diameter winding was by winding the chemically converted wire around a bar having a diameter equal to the diameter of the coated wire and evaluating the surface condition of the chemical conversion coating.
[2] Annealed aluminum wire having a diameter of 0.9 mm.
[3] At room temperature.
[4] At 259° C., 15 hours.

EXAMPLE 2

A semi-hard aluminum (more than 99.7% purity) tape having a thickness of 1 mm. and a width of 30 mm. was passed continuously through a chemical conversion treating bath filled with a chemical conversion treating solution of the same composition as used in Example 1, held at 100° C. at a speed such that it was immersed therein for 4 minutes, and then passed through a wash bath filled with warm water held at 80° C. to produce a tape wire having a coating of a mixture of alumina and chromium oxide. The characteristics of the tape wire are shown in Table 3.

was only chemical conversion treated. The results are shown in Table 4 below.

TABLE 4

| Material | Insulation breakdown voltage of two twisted wires (v.) | | Pencil hardness (H) | | Reciprocal abrasion under 200 g. load (times) | |
|---|---|---|---|---|---|---|
| | Room temperature | 250° C. x 15 hrs. | Room temperature | 250° C. x 15 hrs. | Room temperature | 250° C. x 15 hrs. |
| 0.9 mm. $\phi$, A-Al [1] wire only chemical conversion treated | 70 | 52 | 5 | 5 | 5 | 5 |
| 0.9 mm. $\phi$, A-Al wire chemical conversion treated and then post-treated | 140 | 75 | 7 | 7 | 10 | 6 |

[1] A-Al=Annealed aluminum.

TABLE 3

| Material | Coating thickness ($\mu$) | Insulation breakdown voltage (v.) (superposed) | Pencil hardness (H) | Adhesion (self-diameter bending) [1] |
|---|---|---|---|---|
| 1/2 H-Al [2] | 5.5 | [3] 120 | 5 | Fine powders did not occur, and also cracks did not form. |
| 1/2 H-Al [2] | | [4] 100 | 5 | Do. |

[1] The test for adhesion using self-diameter bending was by bending the chemically converted coated wire around a bar in the shape of a U until the two sides of the U are parallel and separated by a distance equal to the diameter of the bar, the bar also having a diameter equal to the diameter of the wire.
[2] Semi-hard aluminum wire having a thickness of 1 mm. and a width of 30 mm.
[3] At room temperature.
[4] At 250° C., 15 hours.

EXAMPLE 3

An annealed aluminum (more than 99.7% purity) conductor having a diameter of 0.9 mm. was passed through a chemical conversion treating bath filled with a chemical conversion treating solution containing 70 g./liter of $Na_2CO_3$, 35 g./liter of $Na_2CrO_4$ and 2 g./liter of NaOH held at 90° C. at a speed such that it was immersed therein for 5 minutes to provide an insulated wire having a coating of a mixture of alumina and chromium oxide. The insulated wire was then immersed for 5 seconds in a bath of acrylic resin varnish (Methalack M, trademark, Fujikura Kasei Co., Ltd.), and squeezed with a felt, followed by passing for 3 minutes in a drying oven at 80 to 120° C. The wire was then passed through a bath of paraffin obtained by heat-melting solid paraffin 145 specified in JIS, squeezed with a felt, and then dried for 1 minute with air at 30–40° C. The properties of the resulting wire were compared with those of the wire which was only chemical conversion treated. The results are shown in Table 4 below.

While the invention has been described in detail and in terms of specific embodiments thereof, it will be apparent to one skilled in the art that various changes and modifications can be made therein without departing from the spirit and scope thereof.

What is claimed is:

1. A method of forming an electrically insulating coating of alumina and chromium oxide on the surfaces of aluminum or aluminum alloy wires which comprises passing the wires of aluminum or an aluminum alloy through a chemical conversion treating solution held at 80 to 110° C. containing sodium carbonate and sodium chromate in a concentration of 20 to 200 grams per liter of water and in which the weight ratio of sodium carbonate to sodium chromate ranges from 10:5 to 10:10 to form an electrically insulating coating of alumina and chromium oxide on the wires.

2. The method of Claim 1, wherein said method additionally comprises coating a synthetic resin varnish on said alumina and chromium oxide coating.

3. The method of Claim 2, wherein said method additionally comprises coating a paraffin on said synthetic resin varnish coating.

4. The method of Claim 1, wherein the weight ratio of sodium carbonate to sodium chromate in said treating solution is 10:6 to 10:7.

5. The method of Claim 1, wherein sodium hydroxide is added to said treating solution in an amount of 2 to 10 g. per liter of the solution.

6. The method of Claim 2, wherein sodium hydroxide is added to said treating solution in an amount of 2 to 10 g. per liter of the solution.

7. The method of Claim 3, wherein sodium hydroxide is added to said treating solution in an amount of 2 to 10 g. per liter of the solution.

References Cited
UNITED STATES PATENTS

| 3,725,137 | 4/1973 | Boose et al. | 148—6.2 |
| 2,066,180 | 12/1936 | King | 148—6.2 |
| 2,019,229 | 10/1935 | Leahy | 148—6.27 X |
| 2,460,897 | 2/1949 | Meyer | 148—6.2 |
| 3,119,897 | 1/1964 | Coper | 117—231 X |
| 3,364,080 | 1/1968 | Hall | 148—6.2 |
| 3,032,435 | 5/1962 | Michel | 148—6.27 |
| 3,059,046 | 10/1962 | Westervelt et al. | 117—231 |

RALPH HUSACK, Primary Examiner

U.S. Cl. X.R.

117—231; 148—6.2, 6.27